Dec. 26, 1967   H. MÜLLER   3,360,654
LIGHT BARRIER FOR PREVENTING MACHINE ACCIDENTS
INCLUDING FAIL SAFE DEVICE
Filed April 9, 1965   3 Sheets-Sheet 1

Harro Müller
INVENTOR.

BY Darbo, Robertson &
Vandenburgh
Attorneys

United States Patent Office 3,360,654
Patented Dec. 26, 1967

3,360,654
LIGHT BARRIER FOR PREVENTING MACHINE ACCIDENTS INCLUDING FAIL SAFE DEVICE
Harro Müller, Ottobrunn, Germany, assignor to Erwin Sick, Icking, Isartal, Germany
Filed Apr. 9, 1965, Ser. No. 446,987
Claims priority, application Germany, May 6, 1964, S 90,950
7 Claims. (Cl. 250—221)

The present invention relates to a light barrier apparatus which is particularly suited for use as an accident preventing device and incorporates features to supervise the operability of the apparatus.

Light barriers are known, for instance a safety device for a press, wherein a light ray is periodically moved in rapid sequence across an area to be protected. By suitable optical means the moving light ray will be directed to a photoelectric detector. When an object enters into the area to be protected, the output signal of the photoelectric detector will change to produce an electrical signal. The press is then stopped or reversed by the electrical control apparatus in response to the electrical signal.

A known light barrier of the type indicated comprises a rotating polygonal mirror upon which a beam of light is directed. The polygonal mirror is located in the focal point of a narrow concave mirror so that the beam of light deflected periodically during rotation of the polygonal mirror will be moved in parallel relationship to itself and will periodically sweep across an area limited at one side thereof by the concave mirror. At the other side of this protected area a triple strip type reflector is provided which reflects the beam of light back exactly on its path of incidence at every position thereof. Between the light source and the polygonal mirror there is an inclined partially transmitting mirror which directs the returning beam of rays to a photoelectric detector.

Thus, with such an arrangement the area to be monitored will be periodically scanned at high frequency. If the area to be monitored is clear, so that the beam of light is unimpeded to pass forward and backward, the detector receives substantially constant light. However, if an obstacle such as the hand of an operator enters into the area being monitored, a sequence of dark pulses will be created at the detector. These pulses actuate a relay via a suitable electronic network, which stops the machine.

As further protection, the machine should not be permitted to operate unless the photoelectric safety device is in operating condition. If the light barrier becomes incapable of functioning properly due to failure of some component, the machine should be stopped. Therefore, with the prior art light barriers a function monitoring is provided to monitor the light barrier after each press stroke, To do this, the light barrier will be temporarily interrupted during the safe phase of the ram movement, i.e., during its upstroke. During this interruption both the switching relay and the required monitoring relays must execute a complete test cycle. Only if this test cycle runs as prescribed, will the press be released for a further stroke. However, this type of monitoring leaves out the possibility that after "testing," and thus during the downward movement of the press ram, a part of the photoelectric safety device may become inoperative and the safety device will not function properly. If at that very moment someone reaches into the zone of danger, an accident might occur despite the described testing.

be monitored (protective cycle) function check is made to

It is therefore a primary object of the present invention to preclude this possibility of a failure occurring at a critical instant. According to the invention this object is attained by providing that after each sweep of the area to be monitored (protective cycle) a function check is made to see that the protective apparatus is operating properly. Thus at each such interval, a dark pulse is produced during a monitoring cycle. Circuitry is provided which stops the machine if there are dark pulses during the protective cycle (indicative of the operator being in the danger area) or if there are no dark pulses during the monitoring cycle (indicative of equipment malfunctions). Therefore, in accordance with the invention, a function monitoring of the safety device is not only effected after each press stroke (or any other cycle of operation), but the function will be monitored anew with high frequency after each sweep of the area to be monitored. Also, if during the downward movement of the press ram an optical or electronic element of the light barrier becomes inoperative, a signal will be generated to shut off the machine.

"Dark pulses" can only occur as a contrast to a preceding bright pulse. A situation might occur in which the total height of the area to be monitored is obscured by an obstacle so that the photoelectric detector will not receive any light at all and will therefore be unable to supply any light (and thus no electrical) "pulses." According to the invention the beginning and end of each protective cycle is separated from the monitoring cycles by a short bright light pulse. These bright pulses are produced by small auxiliary mirrors mounted on the mirror wheel and positioned to throw light directly on the photoelectric detector. Therefore light pulses always will be supplied to the photoelectric detector and, necessarily "dark pulses" must occur during the monitoring cycle. Therefore, in accordance with the invention, both the monitoring pulses and the protective pulses produced in the protective cycle by an obstacle in the path of rays are "dark pulses." With respect to non-linearities, phenomena of saturation or overriding effects which after all always signifies a non-linearity, it is of importance that the differently evaluated pulses have the same polarity.

Different circuitries for fulfilling the function according to the invention can be devised. Advantageously the circuitry is provided with a phase dividing filter to sort out the different pulses, i.e., the protective pulses and the monitoring pulses. For evaluation of the pulses the circuitry may include one or several gates having inputs at which the monitoring pulses, i.e. the pulses derived from a rate monitoring of the motor, and the protective pulses are applied. This circuitry effects a signal upon the occurrence of any one of: the monitoring pulses are not present; the rate monitoring pulses are not present; or protective pulses are present.

Expediently the arrangement is provided such that the output signal of the phase dividing filter, originating from an obstacle, is supplied to two gates, the gates being designed as "AND-gates" as well as "OR-gates" in dependence on the energization thereof. Each gate has two inputs. Protective pulses (when present) are supplied to a first input of each gate. The monitoring pulses are supplied to the second input of one gate and the pulses derived from the rate of the scanning apparatus being monitored as to frequency are supplied to the second input of the other gate. Thus a determination will be made whether there are monitoring pulses present, whether the scan frequency deviates from the prescribed value, and whether protective pulses are present. With such an arrangement the failure of any electric or optical element generates a signal at the output of the gates to stop the machine. Thereby, the equipment is made "safe against possible accidents." The output signals of the gates after corresponding amplification thereof serve for controlling two switching relays. According to the invention circuitry is furthermore provided for controlling the sensitivity of at least one pulse forming stage. The response threshold of the switching relays and the electronic switching stages (multivibrators), respectively, is never exactly the same. Due to this, without a sensitivity control the switching relays would respond at different times with slow penetration into the path of rays of the light barrier. However, the sensitivity control brings about a strict synchronism in the operation of the relays. As the relay contacts are conveniently cross-connected, every deviation from such synchronism of the relays may additionally generate a signal whereby to block the machine. Thereby, safety is furthermore substantially increased.

Further objects and advantages will become apparent from the following description taken in conjunction with the drawings, in which:

FIGURE 1 schematically illustrates the mechanical design of a light barrier in accordance with the present invention;

Figure 1:
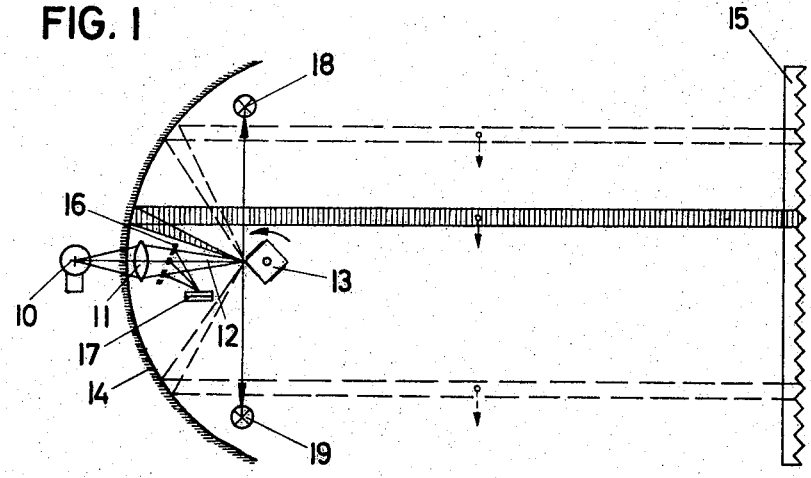

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements or combinations in which the inventive concepts are found.

From a light source 10 a beam of light 12 is produced through a lens 11. This beam of light is focused on a rotating polygonal mirror 13 and is periodically deflected thereby. The polygonal mirror 13 is arranged in the focal point of a narrow concave mirror 14 across which the beam of light 12 is directed. Consequently the beam of light 12 will sweep in parallel relationship periodically from the top to the bottom of the area to be monitored, which is arranged in the plane of the paper in FIGURE 1. At the other side of such area to be monitored there is arranged a reflector 15 comprising a strip of many small triples. As is well-known, such a reflector has the property of always reflecting incident light back into its direction of incidence irrespective of the angle of incidence thereof. Thus, the beam of light 12 will be reflected back into its path of incidence and after passing over concave mirror 14 and polygonal mirror 13 it will strike an inclined partially transmitting mirror 16 between light source 10 and polygonal mirror 13, whereby a portion of the returning light will be passed to a photoelectric detector 17. The light emitting and sweeping apparatus (i.e., 10, 13, 14, etc.) and the detector apparatus (i.e., 17, etc.) make up an area monitoring means.

Figure 2:
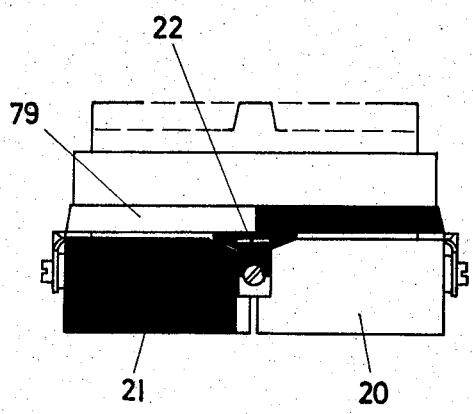
FIGURE 2 illustrates the polygonal mirror with the arrangement in accordance with the present invention.

In the embodiment as described the polygonal mirror comprises four surfaces which are alternatingly mirrored and blackened. Upon intervention of a mirrored surface 20 (FIGURE 2) of the polygonal mirror 13 the beam of light 12 sweeps across the area to be monitored and upon returning strikes the detector 17 if there is no obstacle present in this area being monitored. During the subsequent intervention of the blackened side of face 21, no light will strike the detector 17. The detector 17 supplies an electrical pulse indicative of no light, referred to herein as a "dark pulse." However, the detector 17 is only able to supply a dark pulse when having been illuminated previously, i.e., when a contrast occurs. For instance, it might happen, that all of the reflector strip 15 is obscured by an obstacle so that no light strikes the detector either during passage of the mirrored surface 20 (protective cycle) or during passage of the blackened surface 21 (monitoring cycle). Thus, no light or electrical pulses occur. For this reason auxiliary mirrors 22 are provided on the edges of the polygonal mirror 13 between mirrored surfaces 20 and blackened surfaces 21. During the transition between the protective and monitoring cycles, auxiliary mirrors 22 cause light to be transmitted directly, that is, not via reflector 15, to the photoelectric detector 17. Thereby, the protective and monitoring cycles are positively separated from each other by bright pulses.

Figure 3:
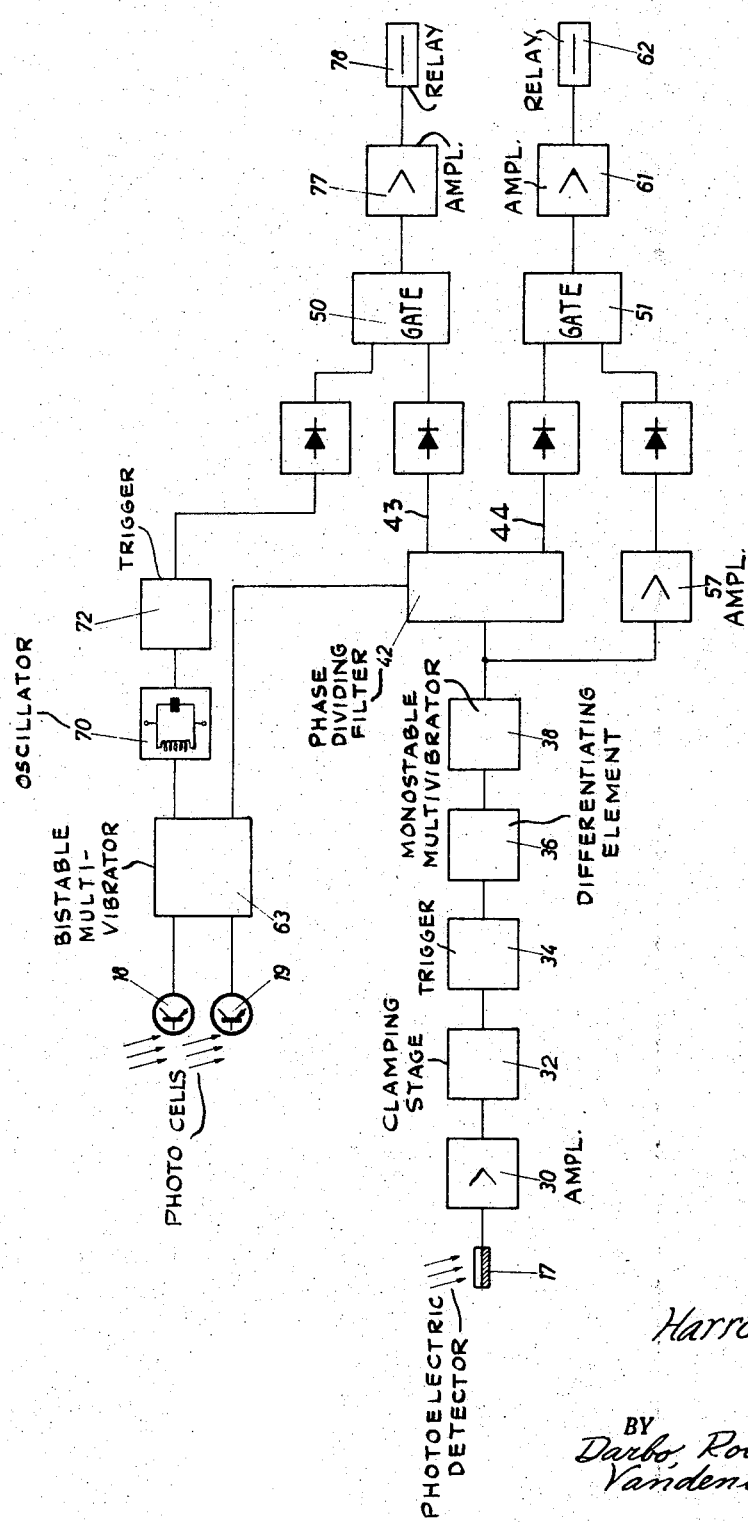
FIGURE 3 illustrates a block diagram of the electric circuitry.
Figure 4:
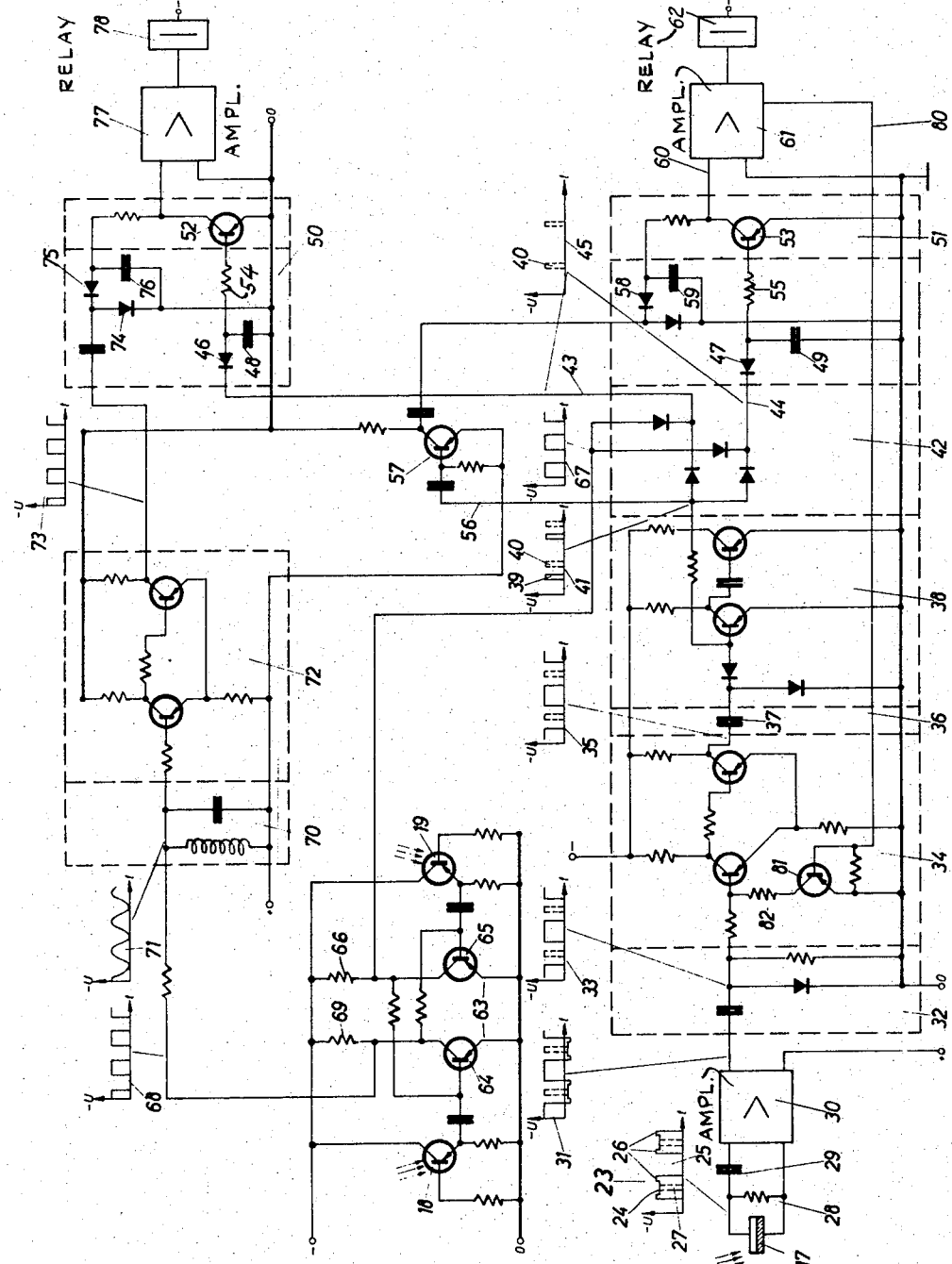
FIGURE 4 is a somewhat simplified overall circuit diagram.

For evaluation of the light (or, perhaps more specifically, the dark) pulses the phase of the polygonal mirror must be used. This may be done in different ways. If a "rigid-in-phase" synchronous motor is being employed for actuating the polygonal mirror, the phase of the supply voltage may be used directly as reference quantity. In such cases no additional components are required. When using drive motors which are not rigid-in-phase, the phase may, for example, be obtained by two photoelectric detectors 18 and 19 which are arranged adjacent the upper and lower ends of concave mirror 14, and offset by about 180°. A ring 79 is mounted upon the rotor of the drive motor. Ring 79 is divided into reflecting and non-reflecting zones. Light from source 10 is reflected by such ring and is directed to a photoelectric detector (not shown), to obtain the phase relation. It is also possible to magnetically pick off the phase position. In the embodiment of FIGURES 1, 3 and 4 the beam 12 is alternately directed to photocells 18 and 19 to provide electrical signals indicative of the phase position.

The photoelectric detector 17 is formed by a silicon photoelement. This is an active element which itself supplies a current upon illumination thereof and does not only change its resistance as do photoconductive cells or the like. This precludes the danger of simulation of an illumination of the detector by a short-circuit. In diagram 23 in FIGURE 4 the electrical signals are illustrated which are supplied by detector 17. During the protective cycles the detector receives light as is shown as at 24. During the intervening monitoring cycles 25 it does not receive any light. Between protective cycles 24 and the monitoring cycles 25 the detector will be illuminated via mirrors 22, noted as peaks 26 in the pulse diagram. If an obstacle protrudes into the area being monitored, protective dark pulses 27 will occur as gaps in the pickup signal during the protective cycles 24 as shown in broken lines in diagram 23. The current of the photoelement 17 produces a voltage drop across a resistor 28, which is applied across the input of a broad-band amplifier 30 via a capacitor 29.

At the output of the broad-band amplifier 30 signals are produced as illustrated in diagram 31 in FIGURE 4, the broken line pulses being caused by an assumed obstacle in the path of rays. As compared with diagram 23, a phase reversal has taken place in amplifier 30 and a direct current portion has been lost. By a so-called clamping stage 32 the direct current portion will be added again, for all practical purposes, in the proper magnitude so that the pulses appear related to the zero line as is shown in diagram 33 in FIGURE 4.

The pulses, thus obtained, will be supplied to a trigger 34 at the output of which, as is illustrated as at 35, pulses of well-defined magnitude appear. These pulses 35 will be differentiated by a differentiating element 36 with a capacitor 37. The peaks produced from the front sides of the pulses when differentiated actuate respectively a monostable multivibrator 38. At the output of the monostable multivibrator pulses of well-defined magnitude and width will then appear. In diagram 41 pulses 39 are from the park pulses 25. Pulses 40, shown in broken lines, are protective dark pulses resulting from the dark pulses 27.

These pulses are supplied to a phase dividing filter 42 which is controlled synchronously with the rotation of polygonal mirror 13 in a manner to be described hereinafter. Filter 42 has two outputs 43, 44 at which, only the protective pulses 40 appear (i.e., the dark pulses occurring during the protective cycle and orginating from an obstacle in the path of rays). This is illustrated in diagram 45. The output pulses at 43 and 44 are supplied to one input of each of gates 50 and 51 as direct current signals. These pulses are smoothed by rectifiers 46 and 47 and capacitors 48, 49. The gates comprise one transistor each 52 and 53, respectively, to the base of which the smoothed pulses are supplied through resistors 54 and 55, respectively.

Gate 51 has a second input to which are supplied pulses according to diagram 41 appearing at the input of the phase dividing filter 42. These are applied across the collector of transistor 53 through a wire 56, an amplifier 57 and a rectifier arrangement 58, including a smoothing capacitor 59. At the output 60 of gate 51 an output signal will only be obtained when there are pulses 39 present in the signal to the second input thereof. Pulses 39, of course, are those resulting from the monitoring-dark pulses 25. However, no output signal will be produced at output 60 if pulses 40 are being applied at the first input, i.e., at the base of transistor 53. Through a switching amplifier 61 the relay 62 will be energized if there are no monitoring (dark) pulses 25 or 39 or if there are protective pulses 40. When relay 62 is energized, it switches off the machine being protected.

The phase dividing filter 42 is controlled by two phototransistors 18 and 19 which, as is illustrated in FIGURE 1, are arranged adjacent the edges of concave mirror 14 at the top and at the bottom thereof. These supply a pulse each time the light ray 12 sweeps across them. These pulses control a bistable multivibrator 63 having two transistors 64, 65. If, at the beginning of its scanning movement, the beam of light sweeps across phototransistor 18, the bistable multivibrator will be caused to assume one switching state, and when, at the end of the scanning movement, the beam of light 12 sweeps across the second phototransistor, the multivibrator will be caused to assume the second switching state. It remains in the second switching state during the monitoring cycle where there is no light passing over the blackened surface 21 to fall on phototransistors 18, 19. With the beginning of the next scan cycle there will be a resetting of the multivibrator into the first switching state. Therefore, a square-wave voltage is obtained across resistor 66, as is illustrated in diagram 67 in FIGURE 4. A square-wave voltage in phase opposition thereto appears across resistor 69 of the bistable multivibrator 63 as seen in diagram 68.

The voltage 67 controls the phased dividing filter 42 so that the latter only permits the pulses to pass through which occur during the protective cycle (diagram 45). The voltage 68 is supplied to an oscillating circuit 70 tuned to the normal scan frequency. In the oscillating circuit 70 there will be produced a sine wave according to diagram 71. The amplitude of this sine wave is greatly decreased if the frequency of the square-wave voltage 68 substantially deviates from the natural frequency of the oscillating circuit 70. A trigger stage 72 again transforms the sine wave voltage into a square-wave voltage (according to diagram 73) provided the amplitude of the sine wave exceeds a certain threshold value. Otherwise the output of trigger 72 is zero.

The square wave at the output of the trigger (diagram 73) is applied to the second input of the gate 50. It is rectified and smoothed by means of rectifiers 74, 75 and capacitor 76 and is applied across the collector of transistor 52 of gate 50. To the first input of gate 50 the smoothed pulses 40 from the phase dividing filter 42 is supplied. The output of the gate 50 energizes a relay 78 through a switching amplifier 77. The control is such that the relay will be deenergized and at the same time stop the machine protected, if the second input signal originating from the oscillating circuit 70 is absent (indicating that the scan frequency has deviated from the nominal value thereof) or if there are protective pulses 40 from an obstacle being applied to the gate.

The relays 62 and 78 operate in opposite sense. If one relay pulls up, the other must break off, or vice versa. Additional safety is thereby attained. If, during the press stroke, the transistors in the output circuit fail, it might happen that both relays are energized and remain so. By reason of the operation of the relays in opposite sense, such a condition will switch off the machine being protected. Similarly, a power failure which would deenergize both relays will switch off the machine. If the monitoring dark pulses do not appear at gate 51, the machine will be shut down. Therefore, there is a constant testing of the functional capability of the light barrier about one hundred times per second through the use of the monitoring dark pulses. In case of failure of any element of the light barrier, the machine will be stopped.

A proper and simultaneous actuation of both relays 62 and 78 is attained by a sensitivity control. To this end, a resistor 82 and a transistor 81 are used, which transistor is rendered conductive, thus low-resistant, through wire 80 from amplifier 61, if there is no obstacle in the path of rays, i.e., if there are also no protective pulses 40. Thus, the input of trigger 34 is controlled "insensitively," that is the trigger 34 only responds to a large input signal. As soon as a dark pulse 27 originating from an obstacle in the path of rays exceeds the threshold of trigger 34, the trigger produces an output pulse in response thereto. This produces a signal 40 and causes amplifier 61 to respond. From amplifier 60 a voltage is derived to block transistor 81. Thereby, the threshold of trigger 34 is lowered so that smaller obstacle pulses 27 will result in a signal at the output of the trigger until the smallest signal decreased below the reduced threshold. Optical dissymmetries mainly due to the mirror wheel and whereby obstacle pulses of different magnitude occur, are thus made ineffective. Therefore, the switching relays will always be positively energized.

I claim:
1. In an apparatus for use as a light barrier to provide a warning indication in the event that an object intrudes into a given area, said apparatus having a light source, the improvement comprising: area monitoring means to direct a light beam across said area and to sweep said area repeatedly at high frequency with the light traversing said area being directed to a photoelectric device which produces an electric signal which is a function of the light received thereby, with each sweep constituting a protective cycle, said means shutting off the light to said device for a given period between each protective cycle to produce a monitoring cycle during which a dark pulse occurs; and electrical means connected to said device to provide a warning indication in the event that the light to said device is shut off during a protective cycle and in the event that a dark pulse is not produced during a monitoring cycle.

2. In an apparatus as set forth in claim 1, wherein said monitoring means includes a light emitter to provide the light beam for said area, and wherein light from said emitter is transmitted directly, without traversing said area, to said device for an instant between each protective and monitoring cycle thereby defining the beginning and end of each pulse.

3. In an apparatus as set forth in claim 2, wherein said electrical means includes a phase dividing filter means to separate the dark pulses occurring during a protective cycle from the dark pulses of the monitoring cycle.

4. In an apparatus as set forth in claim 3, wherein said electrical means includes a gate means having two inputs, said gate means being connected to give a warning indication when no signal is applied to the first input and when a signal is applied to the second input, said second input being connected to said phase dividing filter means to apply dark pulses occurring during the protective cycle, and means connected to the first input to apply dark pulses occurring during the monitoring cycle to the first input.

5. In an apparatus as set forth in claim 4, wherein said electrical means includes a second gate means having two inputs, said second gate means being connected to give a warning indication when no signal is applied to the first input thereof and when a signal is applied to the second input thereof; said second input of the second gate means being connected to said phase dividing filter means to apply dark pulses occurring during the protective cycle thereto; and supervisory means associated with the detector means to ascertain the frequency at which the detector means sweeps said area and to produce a go signal when the sweep frequency approximates a predetermined frequency, said supervisory means being connected to said first input of said second gate means to apply said go signal thereto.

6. In an apparatus as set forth in claim 3, wherein said electrical means includes a trigger means requiring that the light to said device be shut off to a major extent to produce a dark pulse during the protective cycle, and sensitivity control means connected to said trigger means and operatively connected to said filter means to reduce the extent that the light to said device need be shut off to produce a dark pulse following the receipt by the filter means of a dark pulse during the protective cycle.

7. In an apparatus for use as a light barrier to provide a warning indication in the event that an object intrudes into a given area, said apparatus having a light source, the improvement comprising: area monitoring means to direct a light beam across said area and to sweep said area repeatedly at high frequency with the light traversing said area being directed to a photoelectric device which produces an electrical signal which is a function of the light received thereby, with each sweep constituting a protective cycle, said means shutting off the light to said device for a given period between each protective cycle to produce a monitoring cycle during which a dark pulse occurs, said monitoring means including a rotating member in the light path to determine the length and frequency of the two cycles; electrical means connected to said device to produce a monitoring electrical pulse each time that a monitoring cycle occurs and to produce a warning electrical pulse each time that the light to the device is substantially cut off during a protective cycle; phase responsive means connected to the detector means and to the electrical means to separate the warning pulses from the monitoring pulses; and switching means connected to the phase responsive means to provide a warning indication when said monitoring pulses are not received by said switching means, when warning pulses are received from said switching means and when the frequency of said cycles varies substantially from a predetermined frequency.

References Cited

UNITED STATES PATENTS 2,769,374  11/1956  Sick _____ 250—221

RALPH G. NILSON, *Primary Examiner.*

M. ABRAMSON, *Assistant Examiner.*